United States Patent
Hsien et al.

(10) Patent No.: US 7,898,624 B2
(45) Date of Patent: Mar. 1, 2011

(54) PIXEL ARRAY SUBSTRATE AND LIQUID CRYSTAL DISPLAY

(75) Inventors: Chih-Yung Hsien, Tainan County (TW); Chien-Hong Chen, Tainan County (TW); Ying-Jen Chen, Tainan County (TW)

(73) Assignee: Chimei Innolux Corporation, Miao-Li County (TW)

( * ) Notice: Subject to any disclaimer, the term of this patent is extended or adjusted under 35 U.S.C. 154(b) by 116 days.

(21) Appl. No.: 12/209,391

(22) Filed: Sep. 12, 2008

(65) Prior Publication Data

US 2009/0079892 A1 Mar. 26, 2009

(30) Foreign Application Priority Data

Sep. 20, 2007 (TW) .............................. 96135151 A (51) Int. Cl.
G02F 1/1337 (2006.01)
G02F 1/1343 (2006.01)

(52) U.S. Cl. ....................................... 349/129; 349/144
(58) Field of Classification Search .................. 349/129, 349/144
See application file for complete search history.

(56) References Cited

U.S. PATENT DOCUMENTS

| | | | |
|---|---|---|---|
| 5,870,075 A * | 2/1999 | Yamazaki et al. ............. 345/92 |
| 7,202,928 B2 * | 4/2007 | Lee et al. ..................... 349/141 |
| 7,528,920 B2 * | 5/2009 | Lee et al. ..................... 349/141 |
| 7,554,119 B2 * | 6/2009 | Sawamizu et al. ............ 257/72 |
| 7,599,035 B2 * | 10/2009 | Park et al. .................... 349/141 |
| 2001/0020991 A1 * | 9/2001 | Kubo et al. .................. 349/113 |
| 2004/0212764 A1 * | 10/2004 | Tanaka et al. ............... 349/114 |
| 2005/0036091 A1 * | 2/2005 | Song .......................... 349/129 |
| 2005/0083466 A1 * | 4/2005 | Lee et al. ..................... 349/141 |
| 2006/0169983 A1 * | 8/2006 | Sawamizu et al. ............ 257/72 |
| 2007/0091235 A1 * | 4/2007 | Tanaka et al. ............... 349/114 |
| 2007/0146607 A1 * | 6/2007 | Lee et al. ..................... 349/141 |
| 2007/0153197 A1 * | 7/2007 | Park et al. .................... 349/141 |
| 2009/0009449 A1 * | 1/2009 | Uchida et al. ................. 345/87 |
| 2009/0230399 A1 * | 9/2009 | Sawamizu et al. ............ 257/59 |

* cited by examiner

Primary Examiner—K. Cyrus Kianni
(74) Attorney, Agent, or Firm—Thomas, Kayden, Horstemeyer & Risley, LLP (57) ABSTRACT

A liquid crystal display (LCD) includes a pixel array substrate, an opposite substrate and a liquid crystal layer disposed between the pixel array substrate and the opposite substrate. The opposite substrate has a common electrode. The pixel array substrate has a plurality of pixel regions, a plurality of first pixel electrodes and a plurality of second pixel electrodes. Within each of the pixel regions, a corresponding first pixel electrode and a corresponding second pixel electrode are disposed, wherein each of the second pixel electrodes entirely encloses the corresponding first pixel electrode and is separated from the corresponding first pixel electrode.

20 Claims, 12 Drawing Sheets

PIXEL ARRAY SUBSTRATE AND LIQUID CRYSTAL DISPLAY

BACKGROUND OF THE INVENTION

1. Field of the Invention

The present invention generally relates to a pixel array substrate and a liquid crystal display (LCD), and more particularly, to a multi-domain vertically alignment pixel array substrate (MVA pixel array substrate) and an LCD.

2. Description of Related Art

The rapid progress in terms of multimedia today benefits greatly from the developments in semiconductor devices and displays. Among various displays, the thin film transistor liquid crystal display (TFT LCD) has played a major role on the mainstream display market due to advantages of high display quality, high space utilization, low power consumption and no radiation.

Currently, the performance demand on an LCD from the consumable market focuses on high contrast ratio, no gray scale inversion, low color shift, high luminance, high chroma, high color saturation, rapid response and wide viewing angle. The LCDs qualified for the wide viewing angle requirement at present include twisted nematic liquid crystal display (TN-LCD) with wide viewing films, in-plane switching liquid crystal display (IPS-LCD), fringe field switching liquid crystal display (FFS-LCD) and multi-domain vertically alignment liquid crystal display (MVA-LCD).

Figure 1:
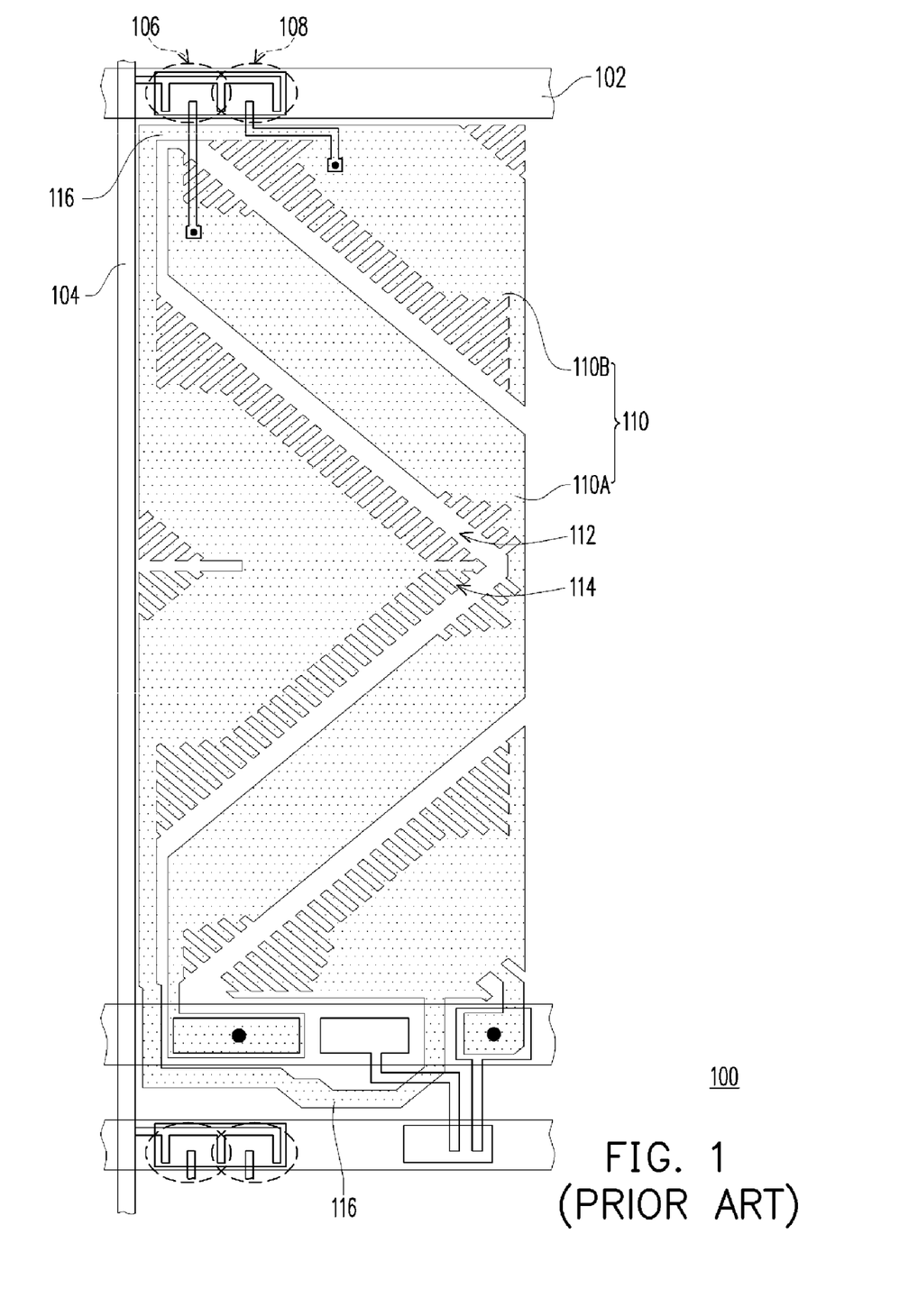
FIG. 1 is a top view diagram of a pixel array substrate within a single pixel region in a conventional MVA LCD.

The related art of a conventional MVA-LCD is briefly described as follows. FIG. 1 is a top view diagram of a pixel array substrate within a single pixel region in a conventional MVA-LCD. Referring to FIG. 1, in a conventional MVA-LCD, a scan line 102 and a data line 104 are disposed on a pixel array substrate 100, wherein the scan line 102 and the data line 104 together define a pixel region. A first active device 106, a second active device 108 and a pixel electrode 110 are disposed within the single pixel region of the pixel array substrate 100. The first active device 106 and the second active device 108 are respectively electrically connected to the scan line 102 and the data line 104. The pixel electrode 110 has a plurality of alignment slits 112 and a plurality of fine slits 114. In addition, in order to promote the display effect of an MVA LCD panel, the alignment slits 112 are used to partition the pixel electrode 110 into a first pixel electrode 110A and a second pixel electrode 110B separated from each other. The first pixel electrode 110A and the second pixel electrode 110B are respectively electrically connected to the first active device 106 and the second active device 108.

The pixel array substrate 100 is assembled with a color filter substrate (CF substrate) (not shown) having a plurality of slits, and the gap between the pixel array substrate 100 and the CF substrate (not shown) is filled with liquid crystal to form an LCD. After turning on the LCD, the slits (112 and 114) disposed on the pixel array substrate 100 or those disposed on the CF substrate (not shown) are conducive to generate a fringe field effect and the electric field lines at the slits exhibit curved paths. Therefore, the fringe field effect can be utilized to make the liquid crystal molecules arrange in multiple directions so as to obtain several different alignment domains. An MVA-LCD takes advantage of the above-mentioned characteristic to satisfy the wide viewing angle requirement. In addition, while an MVA-LCD is displaying, the first pixel electrode 110A and the second pixel electrode 110B can have different voltages, thereby potentially improving possible problems of color shift when viewing a display frame by a viewer from a large viewing angle.

However, in order to realize the layout of pixel electrode 110 as shown by FIG. 1, the second pixel electrode 110B must typically have a plurality of thin connection portions 116 to interconnect a plurality of electrode patterns at different positions, wherein the length of connection portions 116 can be tens of microns. Unfortunately, if even a minor process error occurs during fabrication of the pixel electrode 110, the connection portions 116 may exhibit broken-line defects. Moreover, once a connection portion 116 has a broken-line defect, the second pixel electrode 110B would be split into two independent electrode patterns, and one of the two independent electrode patterns of the second pixel electrode 110B fails to receive the voltage signal delivered by the second active device 108 for displaying. In other words, a minor process error may deteriorate the production process of the MVA-LCD and result in a lower production yield.

SUMMARY OF THE INVENTION

Pixel array substrates and liquid crystal displays are provided. In this regard, an exemplary embodiment of a pixel array substrate comprises a plurality of pixel regions, a plurality of first pixel electrodes and a plurality of second pixel electrodes, wherein a corresponding one of the first pixel electrodes and a corresponding one of the second pixel electrodes are disposed in each of the pixel regions, and each of the second pixel electrodes entirely encloses the corresponding first pixel electrode and is separated from the corresponding first pixel electrode.

An exemplary embodiment of a liquid crystal display comprises: a pixel array substrate, having a plurality of pixel regions, a plurality of first pixel electrodes and a plurality of second pixel electrodes, wherein a corresponding one of the first pixel electrodes and a corresponding one of the second pixel electrodes are disposed within each of the pixel regions, and each of the second pixel electrodes entirely encloses the corresponding first pixel electrode and is separated from the corresponding first pixel electrode; an opposite substrate, having a common electrode; and a liquid crystal layer, disposed between the pixel array substrate and the opposite substrate.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

DESCRIPTION OF THE EMBODIMENTS

Reference will now be made in detail to the present preferred embodiments of the invention, examples of which are illustrated in the accompanying drawings. Wherever possible, the same reference numbers are used in the drawings and the description to refer to the same or like parts.

Figure 2:
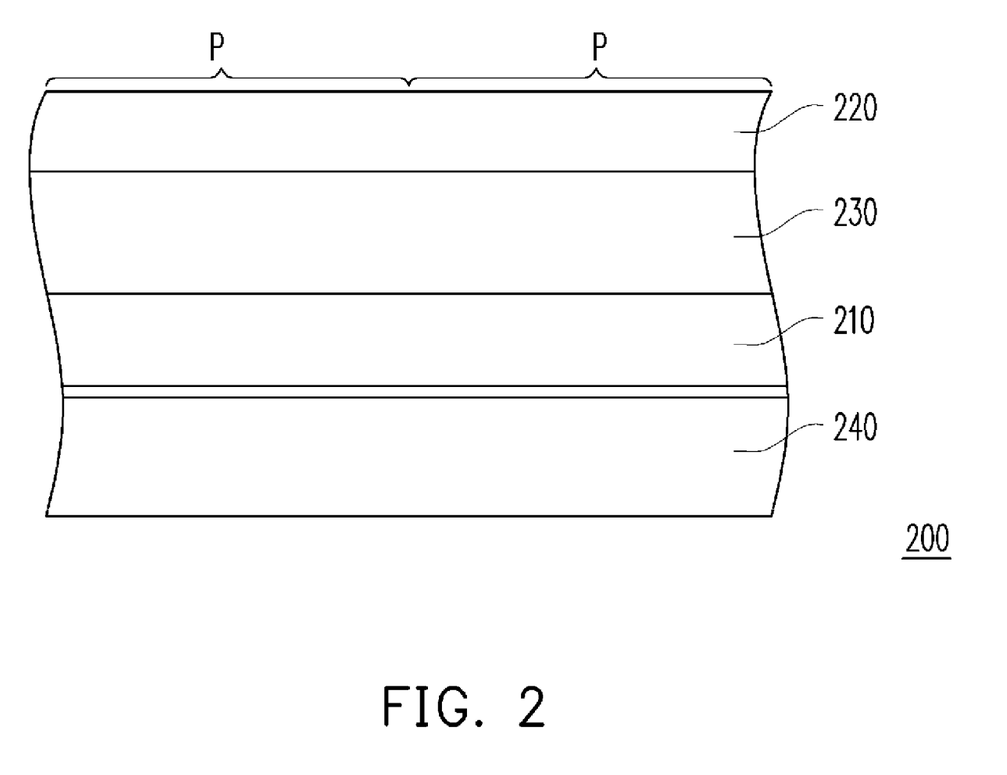
FIG. 2 is a diagram showing an LCD according to an embodiment of the present invention.
Figure 3A:
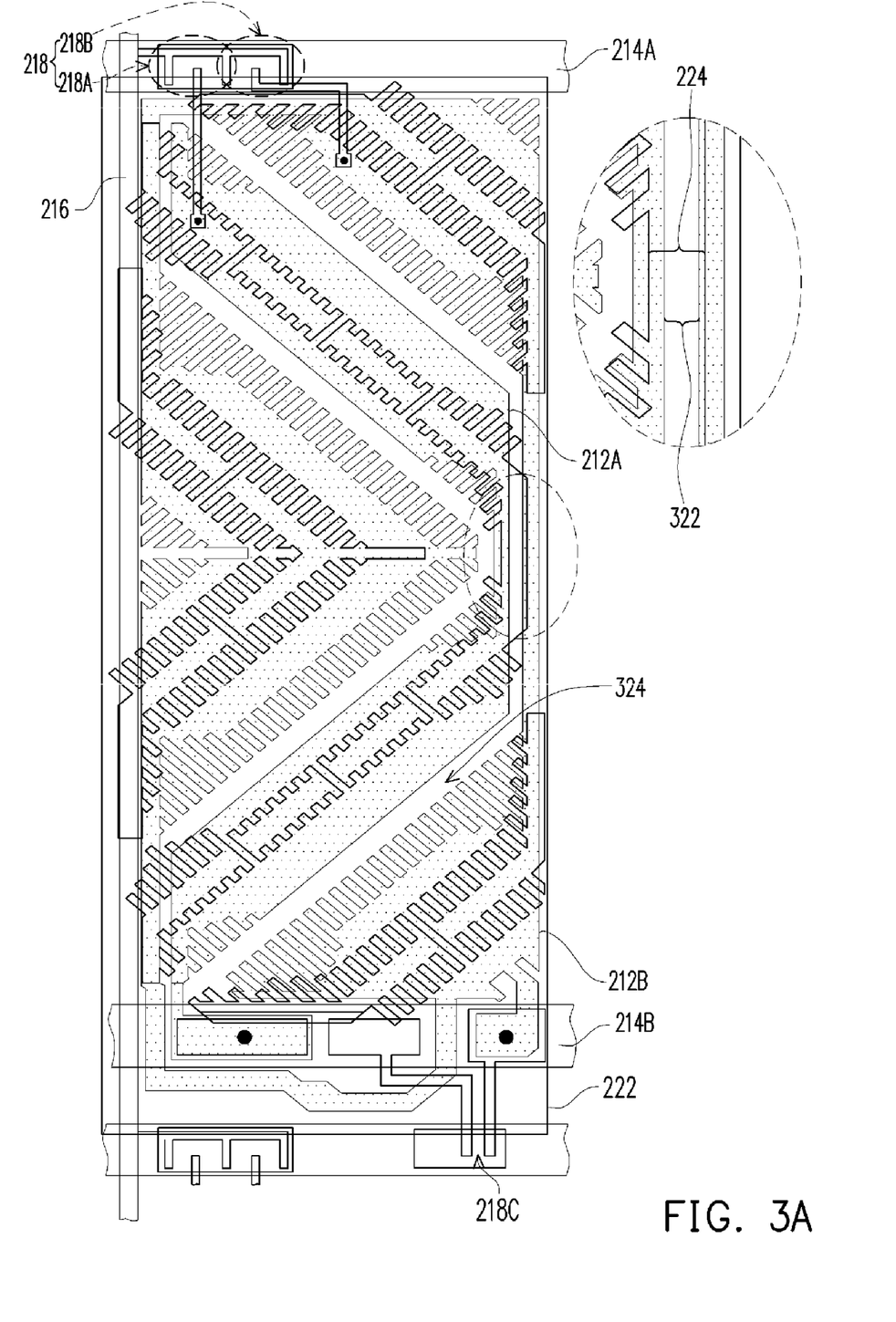
FIG. 3A is a top view diagram of a single pixel region in an LCD provided by an embodiment of the present invention.

FIG. 2 is a diagram showing an LCD according to an embodiment of the present invention and FIG. 3A is a top view diagram of a single pixel region in an LCD provided by an embodiment of the present invention. Referring to FIG. 2, an LCD 200 includes a pixel array substrate 210, an opposite substrate 220 and a liquid crystal layer 230 disposed between the pixel array substrate 210 and the opposite substrate 220. The LCD 200 further includes a backlight module 240, if the LCD 200 utilizes a transmissive design or a transflective design. As such, the pixel array substrate 210, the opposite substrate 220 and the liquid crystal layer 230 are disposed on the backlight module 240.

Referring to FIGS. 2 and 3A, in the LCD 200, the opposite substrate 220 has a common electrode 222, and the pixel array substrate 210 has a plurality of pixel regions P, a plurality of first pixel electrodes 212A and a plurality of second pixel electrodes 212B. A corresponding first pixel electrode 212A and a corresponding second pixel electrode 212B are disposed within each pixel region P. The pixel array substrate 210 further has a plurality of scan lines 214A, a plurality of data lines 216 and a plurality of active devices 218, wherein a scan line 214A intersects a corresponding data line 216 to define a pixel region P. The pixel array substrate 210 further has a plurality of capacitance electrodes 214B disposed thereon and each of the capacitance electrodes 214B is located under the corresponding first pixel electrode 212A and the corresponding second pixel electrode 212B.

Notably, there is no arbitrary limit to the number of the active devices 218 within each pixel region P. Each pixel region P can have two active devices, for example, a first active device 218A and a second active device 218B or have more than two active devices 218. The first active device 218A and the second active device 218B are electrically connected to the corresponding first pixel electrode 212A and the corresponding second pixel electrode 212B. In addition, a third active device 218C can be further disposed in each pixel region P and the third active device 218C is electrically connected to the next scan line 214A, wherein the third active device 218C is electrically connected to the second pixel electrode 212B. When the next scan line 214A turns on the third active device 218C, the voltage of the second pixel electrode 212B is dropped, so that the first pixel electrode 212A and the second pixel electrode 212B may have different display voltages to display in different luminance. The disposition relationship between the first pixel electrode 212A and the second pixel electrode 212B is depicted in the following.

Figure 3B:
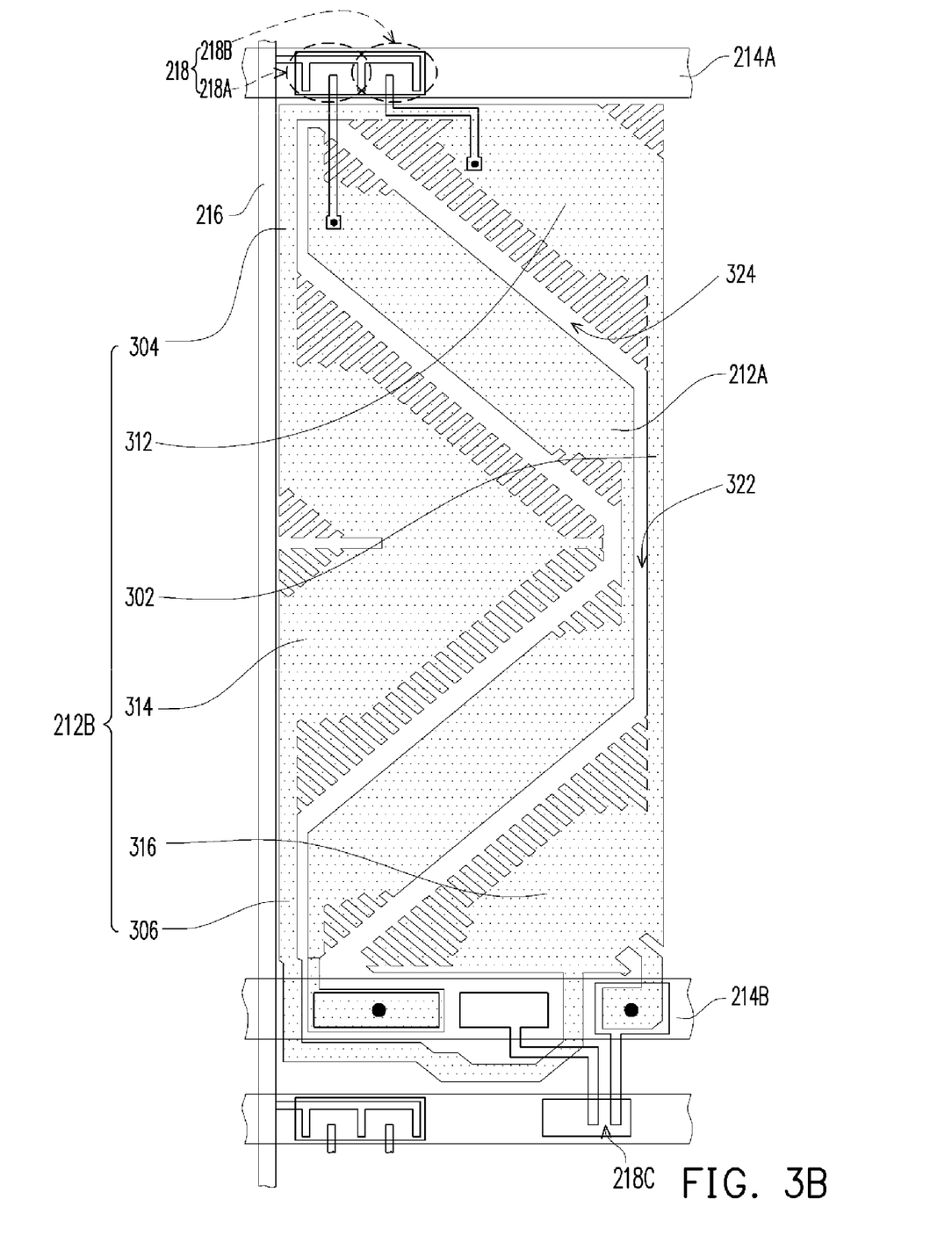
FIG. 3B is a top view diagram of a pixel array substrate within the single pixel region of FIG. 3A.
Figure 3C:
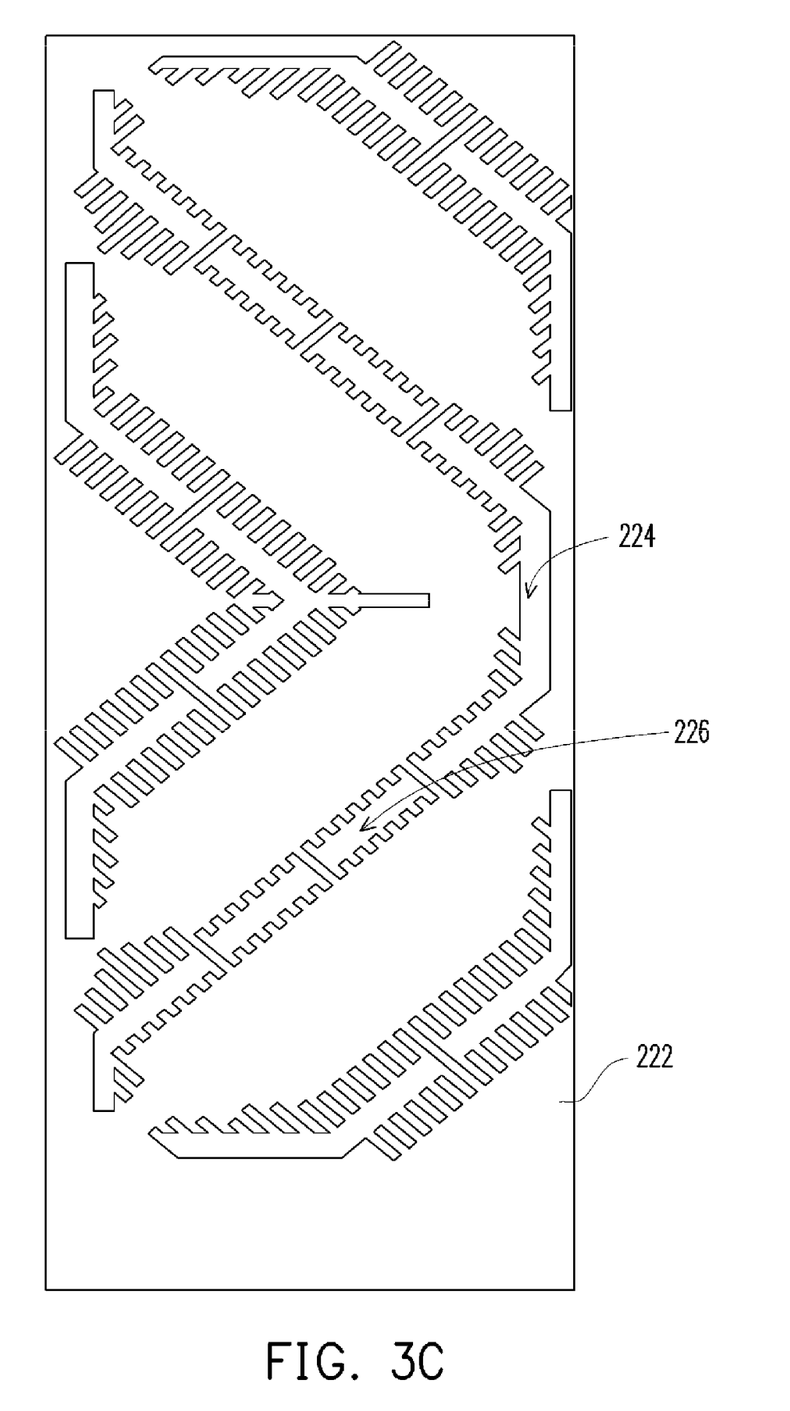
FIG. 3C is a top view diagram of an opposite substrate within the single pixel region of FIG. 3A.

FIG. 3B is a top view diagram of a pixel array substrate within the single pixel region of FIG. 3A and FIG. 3C is a top view diagram of an opposite substrate within the single pixel region of FIG. 3A. Referring to FIG. 3B, the first pixel electrode 212A is roughly V-shaped. The second pixel electrode 212B entirely encloses the first pixel electrode 212A and is separated from the first pixel electrode 212A, i.e., the first pixel electrode 212A and the second pixel electrode 212B do not contact each other. In addition, the first pixel electrode 212A and the second pixel electrode 212B are, for example, fabricated by an oxide conductive layer of the same film layer. Specifically, the first pixel electrode 212A and the second pixel electrode 212B can be fabricated by patterning the same layer made of indium tin oxide (ITO) or indium zinc oxide (IZO).

The second pixel electrode 212B has at least a bar-like connection portion and FIG. 3B shows a plurality of connection portions 302, 304 and 306, wherein the extension directions of the connection portions 302, 304 and 306 are substantially parallel to the extension directions of the data lines 216. In addition, the second pixel electrode 212B has a plurality of block portions 312, 314 and 316. The connection portions 302, 304 and 306 interconnect the block portions 312, 314 and 316 to form the second pixel electrode 212B with a closed pattern. In other words, both ends of each of the block portions 312, 314 and 316 are respectively connected to different connection portions 302, 304 and 306.

Since the connection portions 302, 304 and 306 are thin and long, a minor process error during fabrication of the first pixel electrode 212A and the second pixel electrode 212B may result in a broken-line defect of one or more of the connection portions 302, 304 and 306. In this embodiment, however, both ends of each of the block portions 312, 314 and 316 are respectively connected to different connection portions 302, 304 and 306. Therefore, even though one of the connection portions 302, 304 and 306 has a broken-line defect, the block portions 312, 314 and 316 still respectively have at least an end connected to one of the connection portions 302, 304 and 306.

The second active device 218B is directly electrically connected to, for example, the block portion 312. If the connection portion 306 has a broken-line defect due to a process error, the block portions 314 and 316 would be no longer electrically connected to each other, but the block portions 316 and 312 remain connected to each other through the connection portion 302, which is connected to the other end of the block portion 316. Similarly, the block portion 314 remains connected to the block portion 312 through the connection portion 304, which is connected to the other end of the block portion 314. Thus, the block portions 312, 314 and 316 of the second pixel electrode 212B remain electrically connected to each other, and the block portions 312, 314 and 316 continue receiving voltage signals for displaying. Accordingly, the production yield of the LCD in the embodiment can be increased by means of the above-mentioned design of the second pixel electrode 212B.

Referring to FIGS. 3B and 3C, the connection portion 302 is designed so that the connection portion 302 and the corresponding first pixel electrode 212A (which is enclosed by the second pixel electrode 212B) are separated by a plurality of first main slits 322. The common electrode 222 of the LCD has a plurality of second main slits 224 parallel to the first main slits 322.

Continuing to FIG. 3A, the positions of the first main slits 322 substantially correspond to the positions of the second main slits 224. In the present embodiment, the width of the first main slit 322 is less than the width of the second main slit 224. In other embodiments, the width of the first main slit 322 can be greater than the width of the second main slit 224 and the present invention is not limited thereto. When observing from a direction perpendicular to the display surface of the LCD display panel, the first main slits 322 and the second main slits 224 partially overlap each other. The overlapped portions between the first main slits 322 and the second main slits 224 have weaker electric fields during display, so that the liquid crystal molecules at the overlapped portions have quite small tilt angles and are substantially upright. As a result, the liquid crystal molecules over the first main slit 322 are avoided from being aligned in improper directions, resulting in good display quality.

Figure 3D:
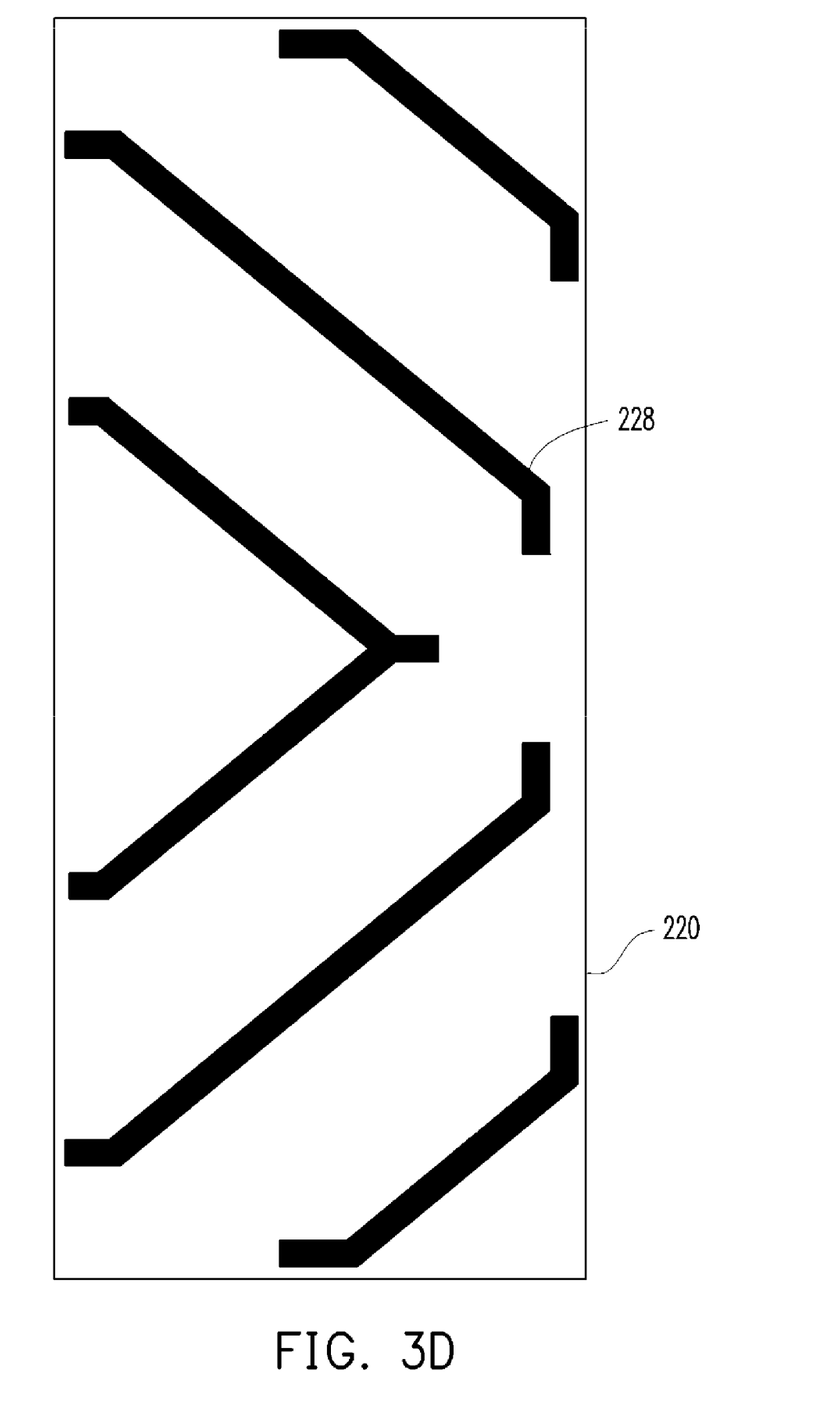
FIG. 3D is a top view diagram of another opposite substrate within the single pixel region of FIG. 3A.

A plurality of first alignment main slits 324 is further formed between the block portions 312, 314 and 316 of the second pixel electrode 212B and the first pixel electrode 212A. The extension direction of the first alignment main slits 324 intersects the extension directions of the scan lines 214A and the extension directions of the data lines 216. For example, the extension directions of the first alignment main slits 324 intersect the extension directions of the first main slits 322 with an included angle of approximately 45°. Additionally, the common electrode 222 has a plurality of second alignment main slits 226 parallel to the first alignment main slits 324. FIG. 3D is a top view diagram of another opposite substrate within the single pixel region of FIG. 3A. Referring to FIG. 3D, the opposite substrate 220 can also have a plurality of alignment protrusions 228 parallel to the first alignment main slits 324 (FIG. 3A). The liquid crystal molecules located at the alignment protrusions 228 can have a pre-tilt angle. That is to say, the alignment protrusions 228 can have the same effect as the second alignment main slits 226 shown in FIG. 3C to produce a wide viewing angle effect. Notably, there is no intention to be limited to the above-mentioned structures of the common electrode.

Figure 4A:
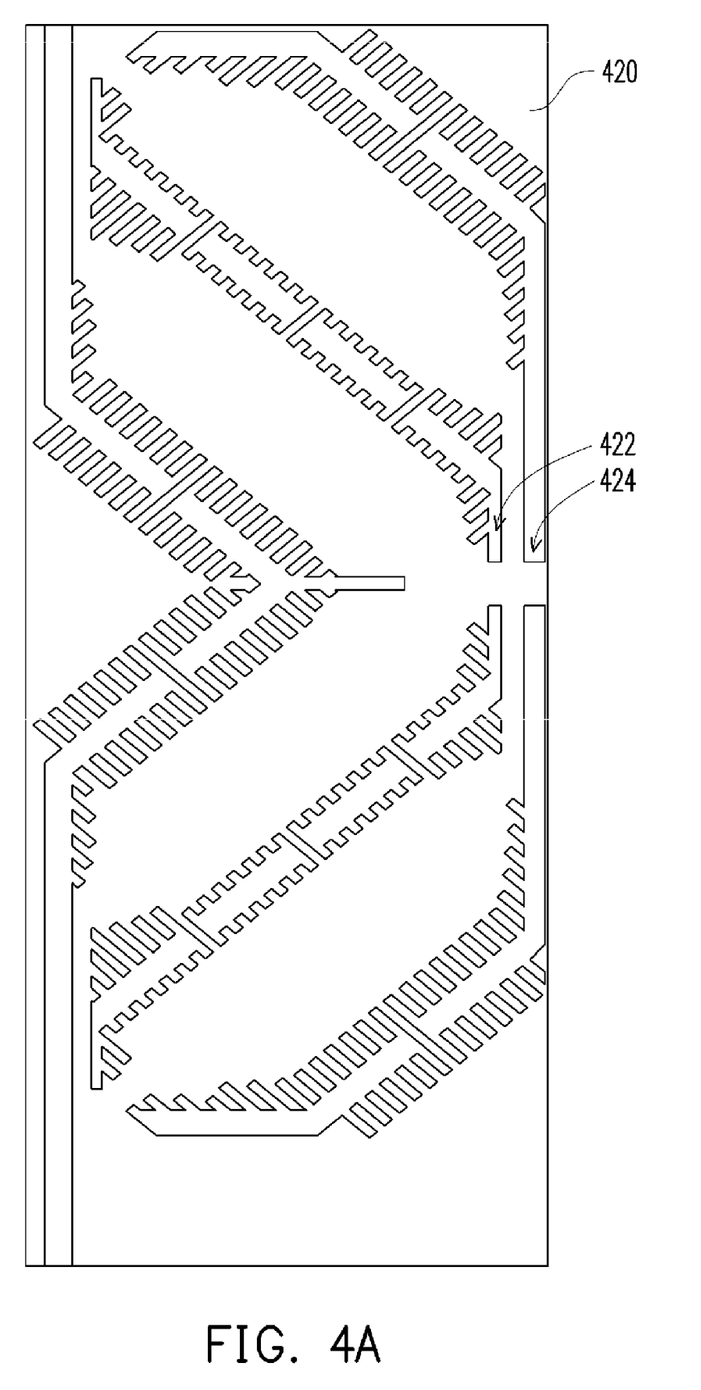
FIG. 4A is a top view diagram of an opposite substrate within a single pixel region according to another embodiment of the present invention.
Figure 4B:
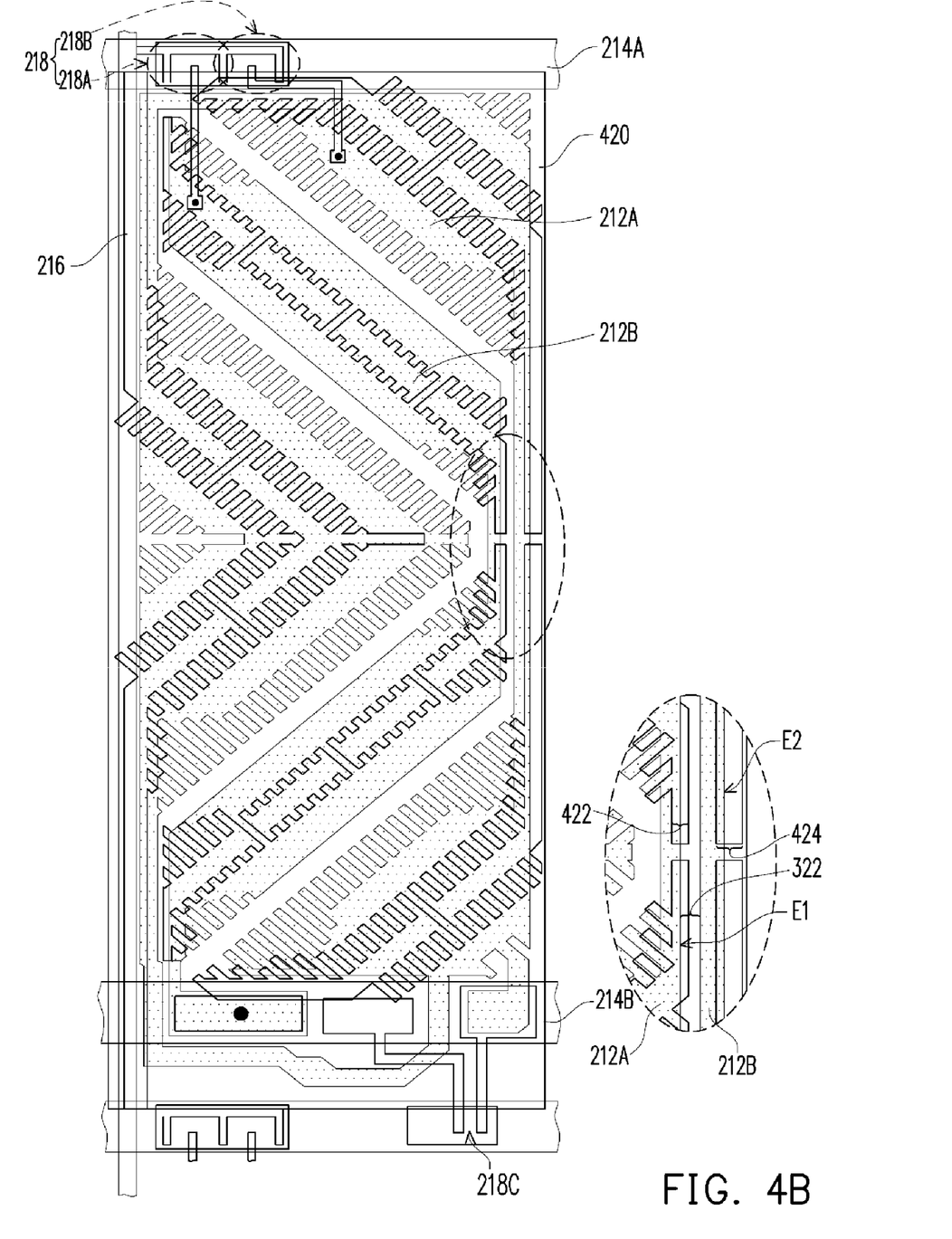
FIG. 4B is a schematic diagram of the integration of the pixel array substrate in FIG. 3B in association with the opposite substrate of FIG. 4A.

FIG. 4A is a top view diagram of an opposite substrate within a single pixel region according to another embodiment of the present invention and FIG. 4B is a top view diagram of the integration of the pixel array substrate in FIG. 3B in association with the opposite substrate of FIG. 4A. Referring to FIGS. 4A and 4B, the common electrode 420 has a plurality of second main slits 422 and a plurality of third main slits 424, wherein the second main slits 422 and the third main slits 424 are parallel to the first main slits 322, and each of the second main slits 422 is adjacent to one corresponding third main slit 424. The positions of the adjacent second main slit 422 and third main slit 424 substantially correspond to the position of one of the first main slits 322, in other words, a pair of the adjacent second main slit 422 and third main slit 424 positionally correspond to that a first main slit 322.

In addition, the position of each second main slit 422, for example, substantially corresponds to the position of an edge E1 of one of the first main slits 322, and the edge E1 is adjacent to the first pixel electrode 212A. In other words, the second main slit 422 is located at the boundary between the first pixel electrode 212A and the first main slit 322, wherein a part of the edge E1 located at the boundary between the first pixel electrode 212A and the first main slit 322 is located within the second main slit 422. The first main slit 322 and the second main slit 422 partially overlap each other. Additionally, the third main slit 424 is located at an edge E2 of the corresponding second pixel electrode 212B, wherein the edge E2 is separate from the first main slits 322. A part of the edge E2 of the second pixel electrode 212B departed from the first main slits 322 is located within the third main slit 424. The liquid crystal molecules located over the first main slits 322 can have appropriate tilt angles by means of the second main slit 422 and the third main slit 424 to provide good display quality.

Figure 5A:
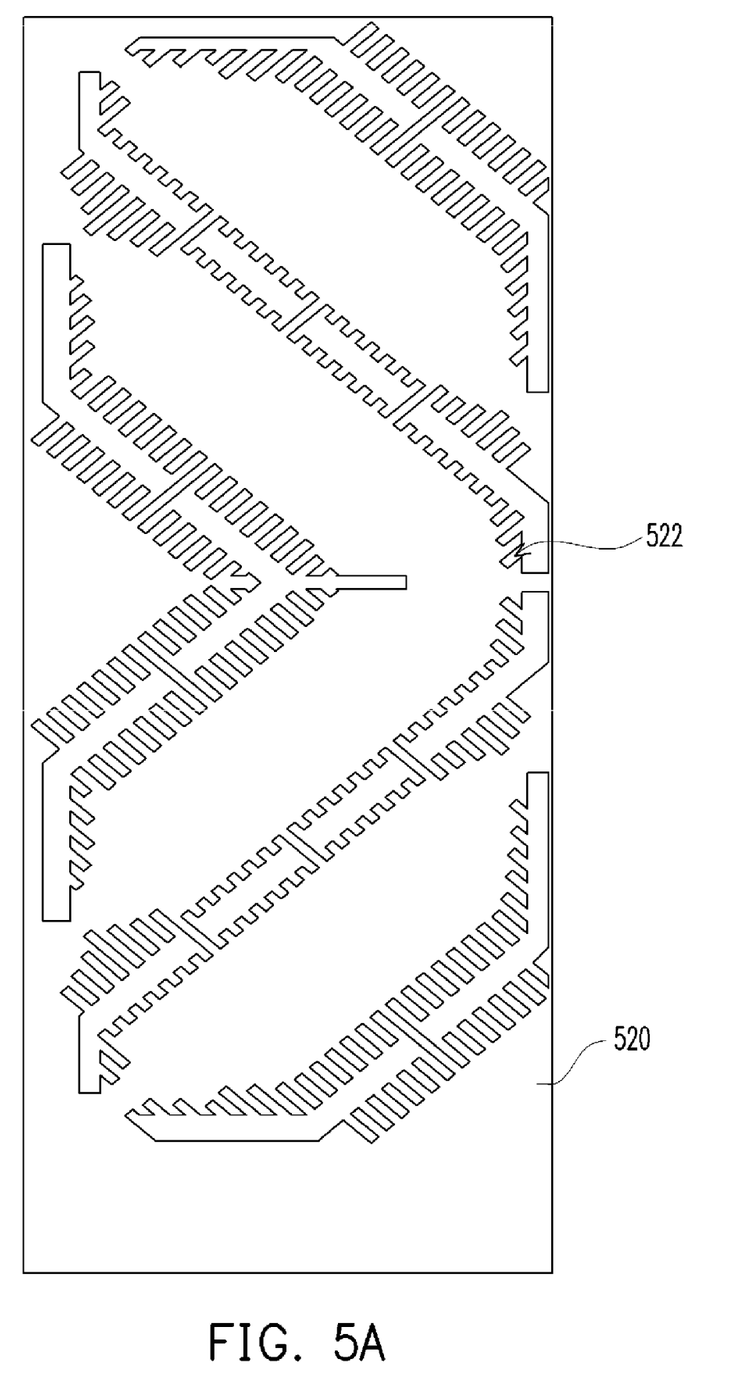
FIG. 5A is a top view diagram of an opposite substrate within a single pixel region in an LCD according to yet another embodiment of the present invention.
Figure 5B:
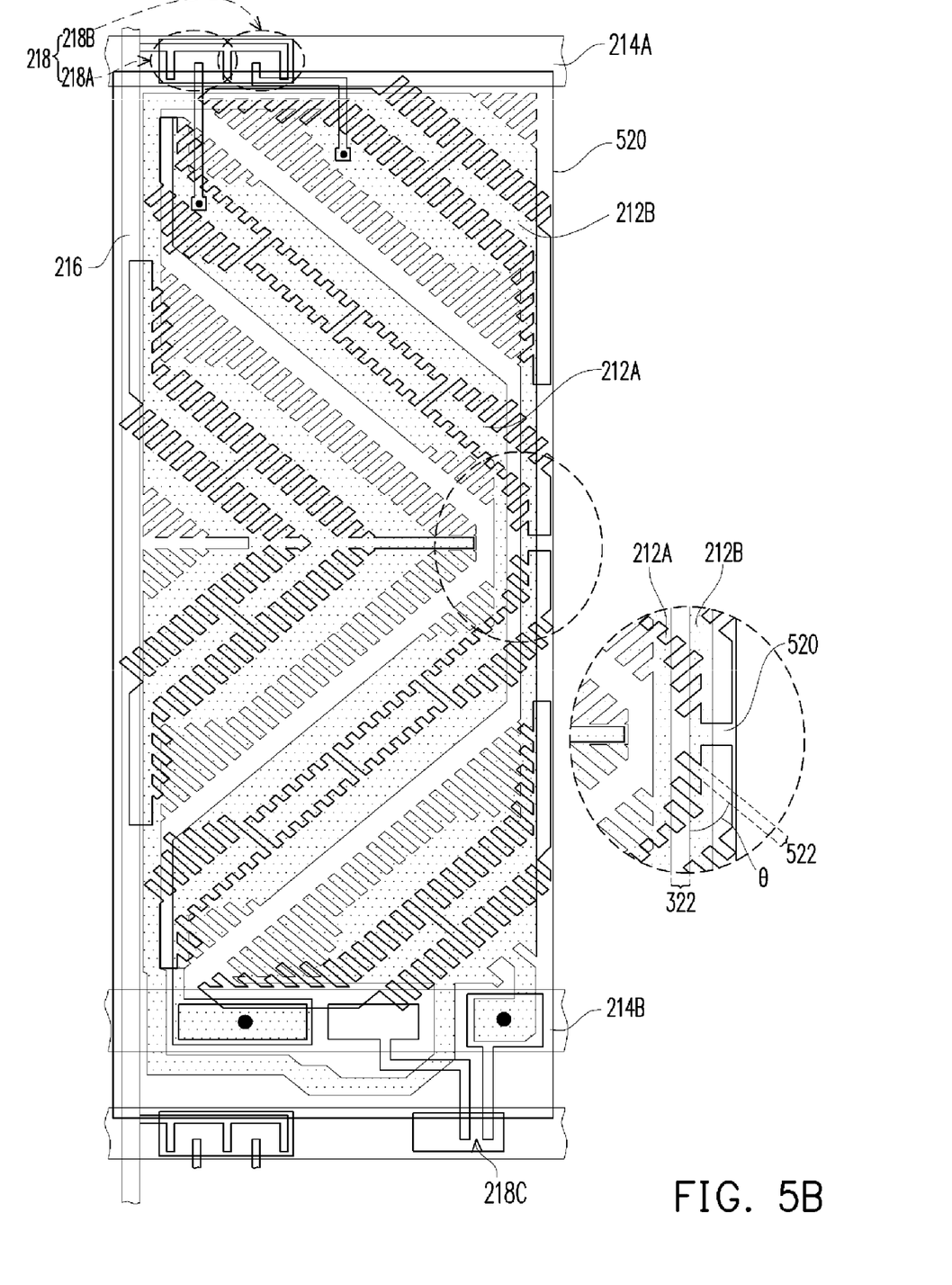
FIG. 5B is a schematic diagram of the integration of the pixel array substrate of FIG. 3B in association with the opposite substrate of FIG. 5A.

FIG. 5A is a top view diagram of an opposite substrate within a single pixel region in an LCD according to yet another embodiment of the present invention and FIG. 5B is a top view diagram of the integration of the pixel array substrate of FIG. 3B in association with the opposite substrate of FIG. 5A. Referring to FIGS. 5A and 5B, a common electrode 520 has a plurality of fine slits 522. Within the same single pixel region, the fine slits 522 intersect the first main slits 322 with an acute angle θ, wherein the acute angle θ is approximately 45°. The positions of a part of the fine slits 522 substantially correspond to the positions of the first main slits 322 and the width of the first main slits 322 is greater than the width of the fine slits 522. The fine slits 522 disposed on the common electrode 520 are located over the first main slits 322 so as to make the liquid crystal molecules located over the first main slits 322 align in a direction parallel to the direction of the fine slits 522 to achieve the ideal status.

In terms of the designs of the first pixel electrode 212A and the second pixel electrode 212B, the liquid crystal molecules in the LCD are preferably aligned at 45° with respect to the extension directions of the first main slits 322, i.e., aligned in a direction perpendicular to the extension directions of the first alignment main slits 324. The preferred extension directions of the fine slits 522 disposed on the common electrode 520 are shown in FIG. 5B, where the included angle between the extension directions of the fine slits 522 and the extension directions of the first main slits 322 are 45°, so that the liquid crystal molecules at the position are aligned in an ideal direction. It should be noted that if the liquid crystal molecules are supposed to align in other directions depending on another design of the first pixel electrode 212A and the second pixel electrode 212B, the extension directions of the fine slits 522 disposed on the common electrode 520 can be varied accordingly. It should also be noted that the second pixel electrode 212B within a single pixel region is not limited to a V-shape.

Figure 6A:
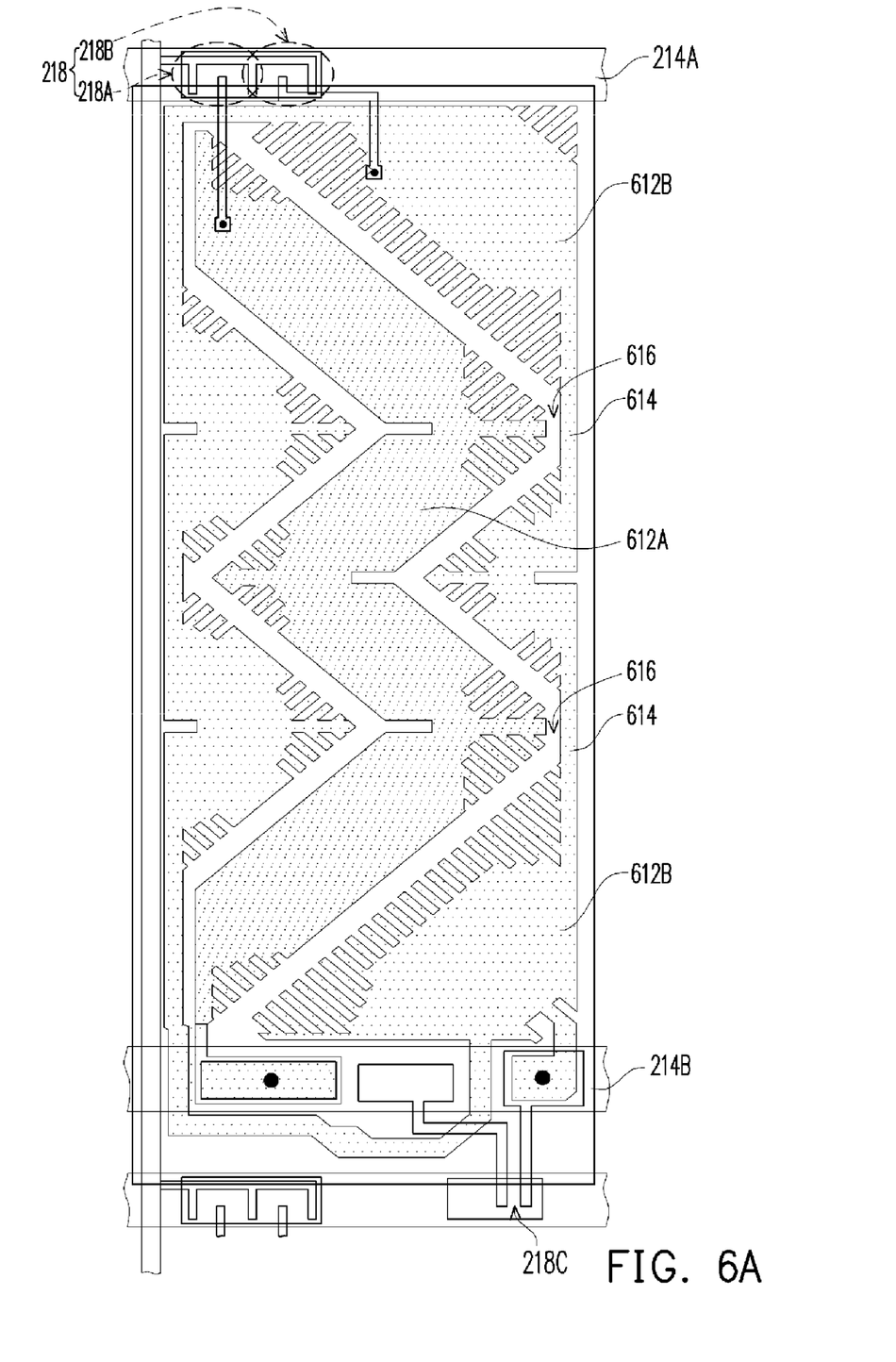
FIG. 6A is a top view diagram of a pixel array substrate within a single pixel region in an LCD according to yet another embodiment of the present invention.
Figure 6B:
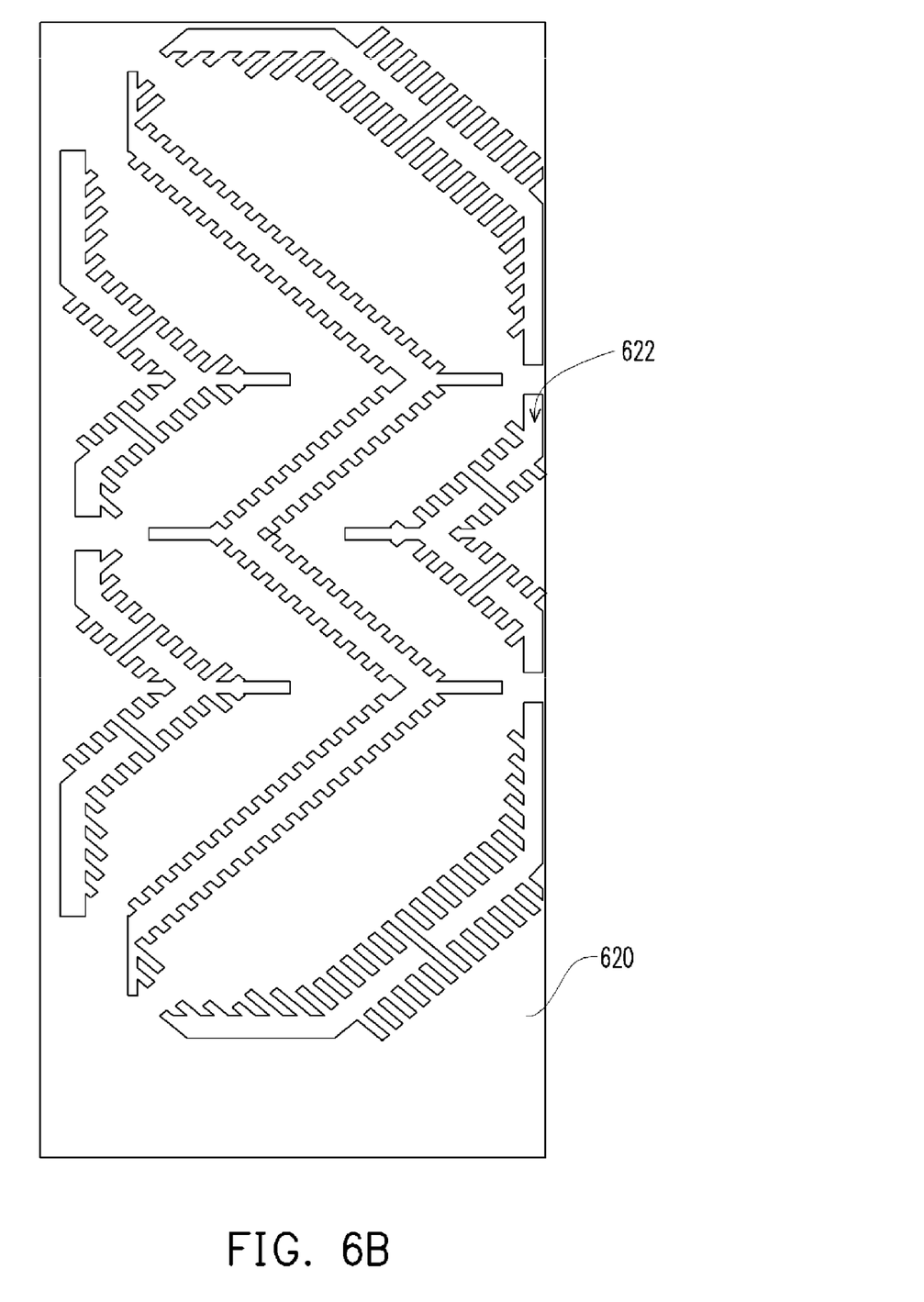
FIG. 6B is a top view diagram of an opposite substrate within the single pixel region shown by FIG. 6A.

FIG. 6A is a top view diagram of a pixel array substrate within a single pixel region in an LCD according to yet another embodiment of the present invention and FIG. 6B is a top view diagram of an opposite substrate within the single pixel region shown by FIG. 6A. Referring to FIG. 6A, the first pixel electrode 612A in the embodiment is, for example, W-shaped, and the second pixel electrode 612B entirely encloses the W-shaped first pixel electrode 612A. The novel design of the second pixel electrode 612B in the embodiment is also effective to solve the problem of broken-line defect where a whole electrode pattern is split and the voltage signal can not be input to the whole electrode pattern, i.e., the above-mentioned design of the second pixel electrode 612B in the embodiment can be also apt to increase production yield.

Additionally, the second pixel electrode 612B has bar-like connection portions 614, wherein the extension directions of the connection portions 614 are, for example, substantially parallel to the extension directions of the data lines (not shown). The connection portions 614 of the second pixel electrode 612B and the first pixel electrode 612A enclosed by the second pixel electrode 612B are separated by first main slits 616. Similar to the above-mentioned embodiment, the liquid crystal molecules located over the first main slits 616 may be present in improper alignment directions to affect the display quality of the LCD. To solve the problem, a common electrode 620 as shown by FIG. 6B is disposed in the LCD. The common electrode 620 has a plurality of second main slits 622. The positions and the shapes of the second main slits 622 are adjusted by design, which in association with the first main slits 616 makes the liquid crystal molecules located over the first main slits 616 align in proper directions. In fact, the shapes and the positions of the second main slits 622 disposed on the common electrode 620 can be adjusted by the designs referring to the common electrodes 222, 420 and 520 of FIGS. 3C, 4A and 5A in the above-mentioned embodiments, for example. In other words, the common electrode 620 can have a main slit or a plurality of main slits or fine slits correspondingly disposed with respect to the first main slits 616, and the common electrode 620 can also have a plurality of alignment protrusions.

In summary, in some embodiments, a single pixel region has a first pixel electrode and a second pixel electrode entirely enclosing the first pixel electrode. The second pixel electrode can be a closed patterned electrode. A minor process error during patterning of the electrodes may cause a broken-line defect of the second pixel electrode, but the broken-line does not split the second pixel electrode into a plurality of independent electrode patterns. Therefore, the pixel array substrate and the liquid crystal display can potentially exhibit higher production yield. In addition, the common electrode can have a different pattern of slits depending on the different designs of the first pixel electrode and the second pixel electrode, which may further promote display quality of the LCD.

It will be apparent to those skilled in the art that various modifications and variations can be made to the structure of the present invention without departing from the scope or spirit of the invention. In view of the foregoing, it is intended that the present invention cover modifications and variations of this invention provided they fall within the scope of the following claims and their equivalents.

What is claimed is:

1. A pixel array substrate, having a plurality of pixel regions, a plurality of first pixel electrodes and a plurality of second pixel electrodes, wherein a corresponding one of the first pixel electrodes and a corresponding one of the second pixel electrodes are disposed in each of the pixel regions, and each of the second pixel electrodes entirely encloses the corresponding first pixel electrode and is electrically separated from the corresponding first pixel electrode.

2. The pixel array substrate according to claim 1, wherein each of the first pixel electrodes is substantially V-shaped.

3. The pixel array substrate according to claim 1, wherein each of the first pixel electrodes is substantially W-shaped.

4. The pixel array substrate according to claim 1, further comprising a plurality of scan lines, a plurality of data lines and a plurality of active devices;
   wherein the scan lines and the data lines intersect each other to define the pixel regions;
   a corresponding one of the active devices is disposed within each of the pixel regions; and
   the active devices are electrically connected to corresponding scan lines and corresponding data lines, and each of the active devices is electrically connected to a corresponding one of the first pixel electrodes and a corresponding one of the second pixel electrodes both located within the same pixel region.

5. The pixel array substrate according to claim 1, wherein edges of the first pixel electrodes and edges of the second pixel electrodes respectively have a plurality of fine slits.

6. A liquid crystal display, comprising:
   a pixel array substrate, having a plurality of pixel regions, a plurality of first pixel electrodes and a plurality of second pixel electrodes, wherein a corresponding one of the first pixel electrodes and a corresponding one of the second pixel electrodes are disposed within each of the pixel regions, and each of the second pixel electrodes entirely encloses the corresponding first pixel electrode and is electrically separated from the corresponding first pixel electrode;
   an opposite substrate, having a common electrode; and
   a liquid crystal layer, disposed between the pixel array substrate and the opposite substrate.

7. The liquid crystal display according to claim 6, wherein each of the first pixel electrodes is substantially V-shaped.

8. The liquid crystal display according to claim 6, wherein each of the first pixel electrodes is substantially W-shaped.

9. The liquid crystal display according to claim 6, wherein:
   the pixel array substrate further has a plurality of scan lines, a plurality of data lines and a plurality of active devices;
   the scan lines and the data lines intersect each other to define the pixel regions;
   the active devices are electrically connected to corresponding scan lines and corresponding data lines;
   a corresponding one of the active devices is disposed within each of the pixel regions; and
   each of the active devices is correspondingly electrically connected to a corresponding one of the first pixel electrodes and a corresponding one of the second pixel electrodes located within the same pixel region.

10. The liquid crystal display according to claim 9, wherein each of the second pixel electrodes has at least a bar-like connection portion, an extension direction of the connection portion is substantially parallel to an extension direction of the data lines, the connection portion of each of the second pixel electrodes and corresponding ones of the first pixel electrodes is separated by a corresponding one of plurality of first main slits, the common electrode has a plurality of second main slits parallel to the first main slits, and positions of the first main slits substantially correspond to positions of the second main slits.

11. The liquid crystal display according to claim 10, wherein a width of the first main slits is less than a width of the second main slits.

12. The liquid crystal display according to claim 9, wherein each of the second pixel electrodes has at least a bar-like connection portion, an extension direction of the connection portion is substantially parallel to an extension direction of the data lines, corresponding connection portions of the second pixel electrodes and corresponding ones of the first pixel electrodes are separated by one of plurality of first main slits, the common electrode has a plurality of fine slits intersecting a plurality of second main slits with an acute angle, and a width of the first main slits is greater than a width of the fine slits.

13. The liquid crystal display according to claim 12, wherein the acute angle is approximately 45 degrees.

14. The liquid crystal display according to claim 9, wherein each of the second pixel electrodes has at least a bar-like connection portion, an extension direction of the connection portion is substantially parallel to an extension direction of the data lines, corresponding connection portions of the second pixel electrodes and corresponding ones of the first pixel electrodes are separated by one of plurality of first main slits, the common electrode has a plurality of second main slits and a plurality of third main slits both parallel to the first main slits, each of the second main slits is adjacent to a corresponding third main slit.

15. The liquid crystal display according to claim 14, wherein the position of each of the second main slits corresponds to the position of an edge of a corresponding one of the first main slits.

16. The liquid crystal display according to claim 9, wherein each of the first pixel electrodes and a corresponding one of the second pixel electrodes are separated by a plurality of first alignment main slits, and extension directions of the first alignment main slits intersect extension directions of the scan lines and extension directions of the data lines.

17. The liquid crystal display according to claim 16, wherein the common electrode has a plurality of second alignment main slits parallel to the first alignment main slits.

18. The liquid crystal display according to claim 16, further comprising a plurality of alignment protrusions disposed on the opposite substrate, wherein extension directions of the alignment protrusions intersect extension directions of the scan lines and extension directions of the data lines.

19. The liquid crystal display according to claim 6, further comprising a backlight module, wherein the pixel array substrate, the opposite substrate and the liquid crystal layer are disposed on the backlight module.

20. The liquid crystal display according to claim 6, wherein edges of the first pixel electrodes and edges of the second pixels respectively have a plurality of fine slits.

* * * * *